Aug. 6, 1968   R. G. NICOLLI   3,395,936
COMBINATION TRAILER AND PICNIC TABLE
Filed Aug. 15, 1966   2 Sheets-Sheet 1

INVENTOR
ROBERT G. NICOLLI
BY Adolph G. Martin
ATTORNEY

INVENTOR
ROBERT G. NICOLLI
BY *Adolph G. Martin*
ATTORNEY

United States Patent Office 3,395,936
Patented Aug. 6, 1968

3,395,936
COMBINATION TRAILER AND PICNIC TABLE
Robert G. Nicolli, 2451 Pinetree,
Trenton, Mich. 48183
Filed Aug. 15, 1966, Ser. No. 572,482
5 Claims. (Cl. 296—23)

ABSTRACT OF THE DISCLOSURE

A trailer that can be converted to a picnic table and benches by extendable members connected to the trailer frame that raise the trailer floor to table height, and trailer sides that pivot out to bench height. The sides are locked by members that pivot into support position when used as benches.

---

This invention relates to car trailers generally, and more particularly to a combination trailer and picnic table.

Picnic facilities, especially those adjoining and readily accessible from large metropolitan areas, are usually grossly over-crowded in the summer months. As a consequence, to insure the use of such facilities during the summertime, one must usually make advance reservations whenever possible, or arrive early at the selected picnic grounds.

Cognizant of this situation, the applicant has, as the primary object of his invention, the provision of a car trailer which may be readily converted into a picnic table having self contained seating benches.

Another object of the invention is to provide a combination car trailer of the type previously described which is light-weight, and readily maneuverable when detached from the vehicle so that it may be easily moved to any selected site on the picnic grounds.

A further object of the invention is to provide a combination car trailer of the type previously described, which is relatively inexpensive to produce, and has a large carrying capacity.

Still another object of the invention is to provide a combination car trailer of the type previously described which is extremely simple to convert, and is easy to tow behind an ordinary passenger vehicle.

Other features and advantages of the invention will become apparent after consideration of a detailed discussion of the same composed with reference to the drawings constituting a portion of this application, and in which.

Figure 1:
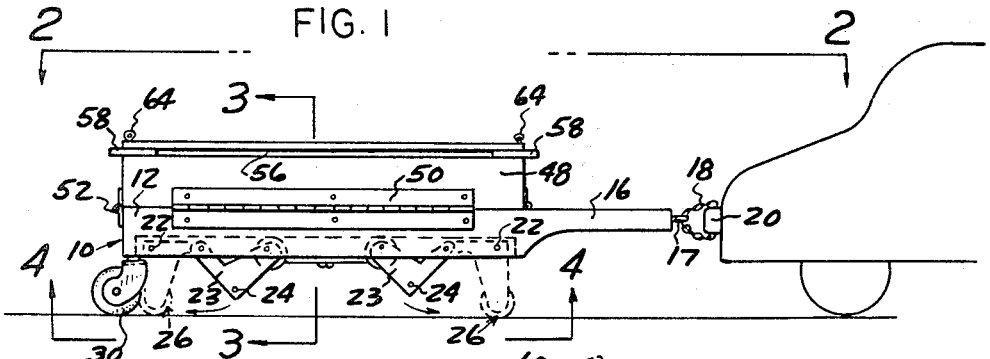
FIGURE 1 is a side elevation view showing the applicant's combination trailer attached to a motor vehicle, and having the angle legs pivoted to an elevated position.
Figure 2:
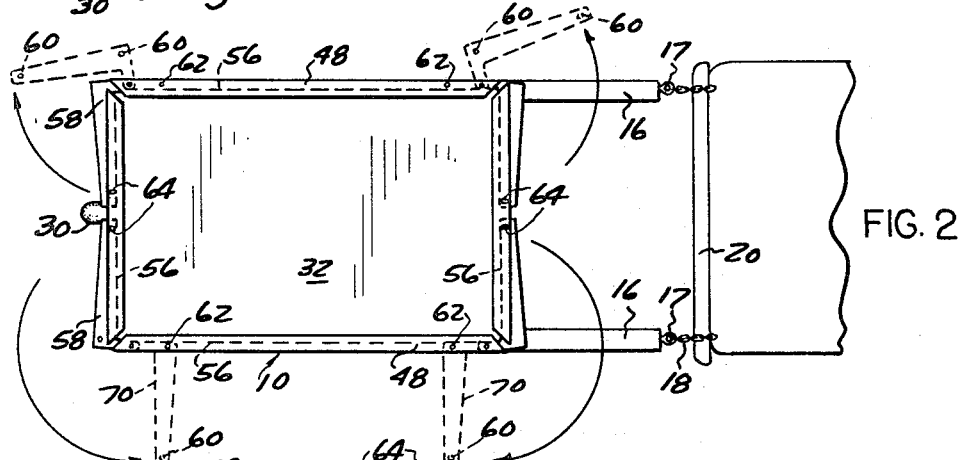
FIGURE 2 is a top plan view, taken substantially on plane 2—2 in FIGURE 1, showing the angle supports in both their functional positions.

For a more detailed description of the invention reference is made to the drawings in which numeral 10 designates a rectangular frame having two side members 12 and two end members 14. The side members 12 are extended on one end to provide handles 16. Eye bolts 17, in each of the handles 16, have attached thereto a section of chain 18 for connection to a vehicle bumper 20, as illustrated in FIGURES 1 and 2. The side members 12 each have therein a longitudinal slot 21 in the lower side, and a laterally disposed opening 22 adjacent each end.

A pair of angle legs 23 are pivoted on each of the side members 12 of the frame 10 so as to be swingable into the longitudinal slots 21. An opening 24, in each of the angle legs 23, is provided for the reception of a removable locking pin 25. A wheel 26, on the lower end of each angle leg 23, makes the trailer conveniently mobile when the same is detached from the vehicle bumper 20. A detachable retainer plate 28 releasably holds the angle legs 24 in an elevated position in the longitudinal slots 21.

A wheel 30 is swivelly mounted on one of the end members 14 of the rectangular frame 10. A floor 32 is attached to the rectangular frame 10 by four collapsible members 34. The collapsible members 34 comprise two hinged components 36 connected to the floor 32 and side members 12 by hinges 38 and 40 respectively. A slotted locking bar 42 is pivoted on one of the components 36 of each collapsible member 34 for holdably engaging a screw 44 in the other component 36. An inwardly disposed bevel 46 is provided around the outer edge of the floor 32.

Figure 3:
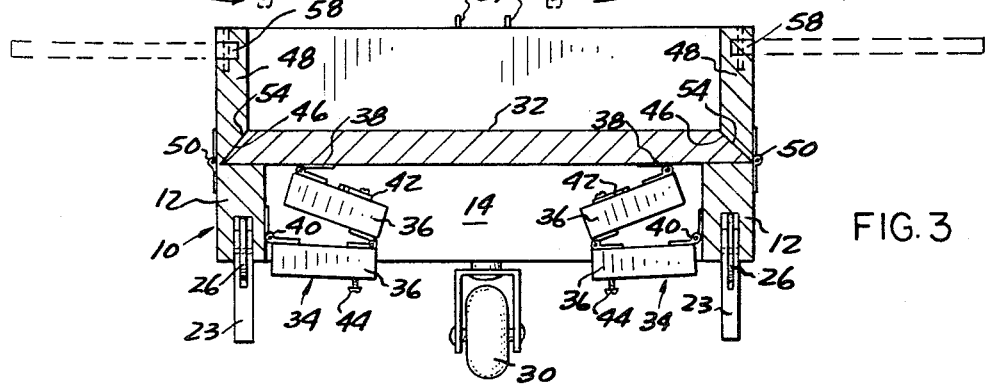
FIGURE 3 is an enlarged section view, taken substantially on plane 3—3 in FIGURE 1, showing structural details of the collapsible members.
Figure 4:
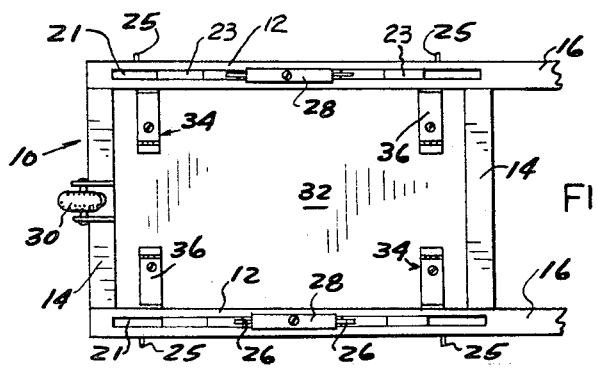
FIGURE 4 is a bottom view of the trailer, taken substantially on plane 4—4 in FIGURE 1, showing the relative locations of the four collapsible members.

Side boards 48 are attached to the four frame members 12 and 14 by elongated hinges 50 and 52 respectively. A bevel 54 is provided on the lower edge of the side boards 48 for engaging the bevel 46 on the floor 32 as shown in FIGURE 3. Longitudinal slots 56 are provided adjacent the upper edge of the side boards 48. Four angle supports 58 are pivoted on two oppositely disposed side boards 48 so as to be swingable into the longitudinal slots 56 in the other two side boards 48. Vertically disposed openings 60 and 62 in the angle supports 58 and side boards 48 respectively, are provided for the reception of a removable locking pin 64.

The preceding discussion completes a description of the structural details of the applicant's invention herein disclosed; however, to insure a more thorough understanding and appreciation of the subject matter presented, a brief discussion will be directed to the manner in which the applicant's combination car trailer and picnic table operates to accomplish its intended function and make possible the realization of the objectives set forth in the introduction of this specification.

In use, when the trailer has been hauled to its destination, the retainer plates 28 are removed, permitting the four angle legs 23 to swing downwardly so as to place the wheels 26 in contact with the ground. Locking pins 25 are then inserted into the laterally disposed openings 22 in the side members 12, and through the openings 24 in the angle legs 23. The trailer is then detached from the vehicle bumper 20 and wheeled to the selected site by means of the handles 16.

Figure 5:
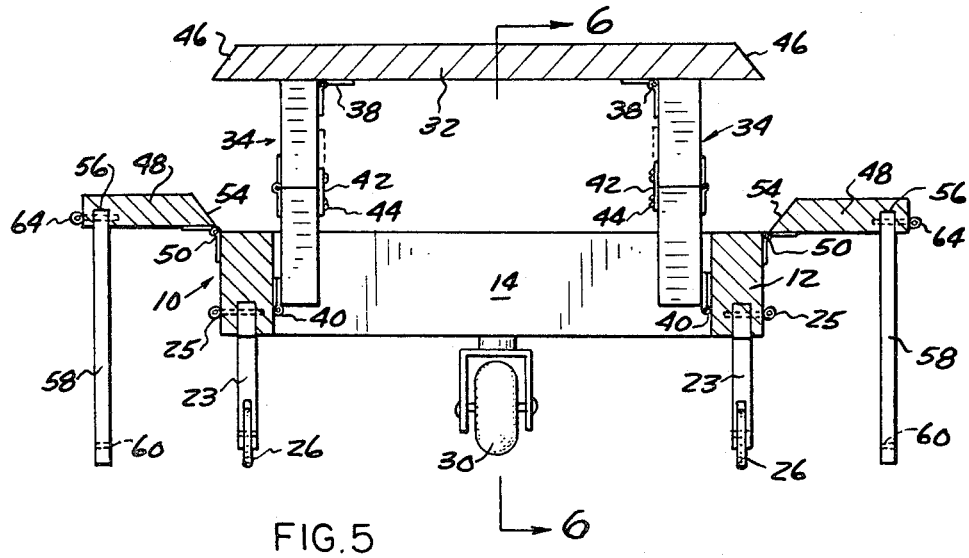
FIGURE 5 is an enlarged section view, similar to FIGURE 3, showing the trailer floor locked in an elevated position and the side boards pivoted to a lateral position.
Figure 6:
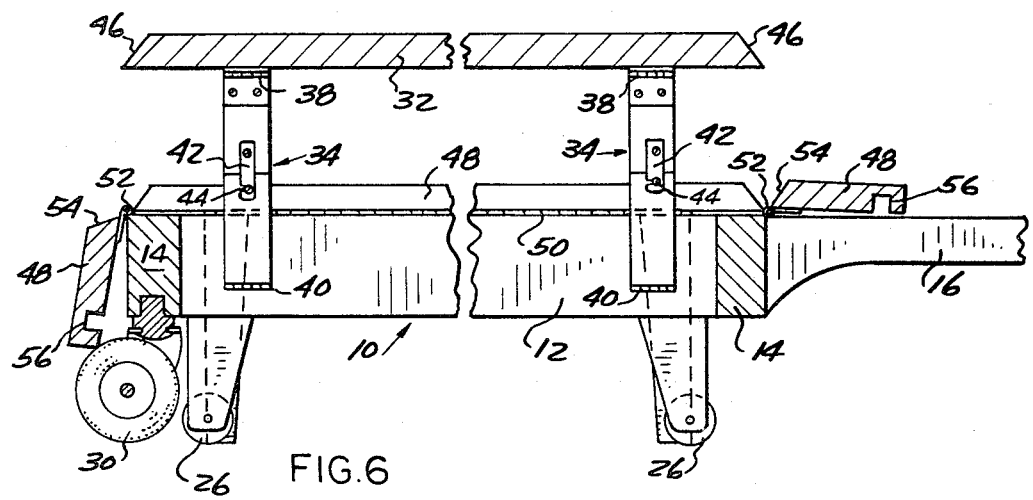
FIGURE 6 is a vertical section view, taken substantially on plane 6—6 in FIGURE 5, showing the locking bars on the four collapsible members.

The locking pins 64 are then removed from the side boards 48 and the angle supports 58 pivoted to the broken line position 70 shown in FIGURE 2. The locking pins 64 are then inserted into the vertically disposed openings 62 in the side boards 48, and through the corner openings 60 in the four angle supports 58 which are then swung outwardly to the full line position shown in FIGURE 5. The floor 32 of the trailer is then elevated to the position shown in FIGURES 5 and 6, and the locking bars 42 moved to the full line position shown in FIGURES 5 and 6.

The hinged components 36 of the collapsible members 34 are thus locked in alignment thereby providing a rigid support for the elevated floor 32. In this modified position of the trailer, the floor 32 provides a convenient table and the side boards 48 serve as benches. When the unit is no longer needed as a picnic table, the steps above described are followed in reverse sequence to compact the structure, and provide a hauling trailer.

Based upon the foregoing discussion, the applicant is of the opinion that his invention has fulfilled a long-felt need in the field of car trailers, and that he has accordingly made a valuable contribution to the related art. However, while the invention was described with reference to the structural details of a single embodiment, it will be appreciated by those familiar with the art that the principles involved are susceptible of numerous other practical adaptations.

Therefore, I claim as new and desire to secure by Letters Patent:

1. A combination trailer for use with motor vehicles comprising a laterally disposed frame, at least one wheeled support on the frame, a floor in the frame, extendable members connecting the frame and the floor so that the latter may be elevated above the frame to provide a table, two pairs of side boards hinged on the frame, and pivoted means on one pair of the side boards for locking them to the other pair so as to hold both pairs in an upright position, such pivoted means providing support for one pair of the side boards when they are swung to a lateral position so as to serve as benches for the table.

2. The combination trailer of claim 1 having in addition thereto: pivoted legs on the frame for supporting the same when it is detached from the vehicle.

3. The combination trailer of claim 2 in which the pivoted legs on the frame comprise spaced members pivotally attached to the frame so as to have a raised and a lowered position, and wheels rotatably mounted on the spaced members.

4. The combination trailer of claim 3 having in addition thereto:
means on the frame for releasably holding the spaced members in a raised position.

5. The combination trailer of claim 1 in which the means for locking the side boards in an upright position comprises pivoted supports on two oppositely disposed side boards movable into locking engagement with the adjoining side boards.

References Cited

UNITED STATES PATENTS

| | | | |
|---|---|---|---|
| 3,180,654 | 4/1965 | Westfall | 296—14 X |
| 3,179,072 | 4/1965 | Coriell | 108—145 |
| 2,780,506 | 2/1957 | Howe | 297—159 X |

PHILIP GOODMAN, *Primary Examiner.*